(12) United States Patent
Vachal

(10) Patent No.: US 7,527,285 B2
(45) Date of Patent: May 5, 2009

(54) SULKY FOR USE WITH WALK-BEHIND MACHINE

(75) Inventor: Tommy Joe Vachal, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 435 days.

(21) Appl. No.: 11/167,892

(22) Filed: Jun. 27, 2005

(65) Prior Publication Data

US 2006/0290080 A1 Dec. 28, 2006

(51) Int. Cl.
B62D 63/06 (2006.01)
(52) U.S. Cl. .................. 280/657; 280/416; 280/416.1; 280/32.7; 280/492
(58) Field of Classification Search ................ 280/416, 280/416.1, 656, 657, 32.7, 492, 493, 491.1, 280/491.3; 56/DIG. 14, DIG. 9, 14.7, 14.9; 172/433, 678
See application file for complete search history.

(56) References Cited

U.S. PATENT DOCUMENTS

| | | | |
|---|---|---|---|
| 918,386 A | 4/1909 | Spensley | |
| 1,011,819 A | 12/1911 | Krueger et al. | |
| 1,764,971 A | 6/1930 | Nilson | |
| 2,210,008 A | 8/1940 | Rodin | |
| 2,354,576 A | 7/1944 | Clark | |
| 3,190,672 A | 6/1965 | Swanson et al. | |
| 3,336,042 A | 8/1967 | Southall | |
| 3,485,314 A | 12/1969 | Herr | |
| 4,114,919 A | 9/1978 | Stowe | |
| 4,175,762 A | 11/1979 | Vaughn et al. | |
| 4,487,006 A | 12/1984 | Scag | |
| 4,509,769 A * | 4/1985 | Weber | 280/491.1 |
| 4,828,282 A | 5/1989 | Pinto | |
| 4,878,339 A | 11/1989 | Marier et al. | |
| 4,989,351 A | 2/1991 | Shear | |
| 4,998,948 A | 3/1991 | Osterling | |
| 5,004,251 A | 4/1991 | Velke et al. | |
| 5,081,826 A | 1/1992 | MacKay | |
| 5,186,483 A | 2/1993 | Sheppard | |
| 5,355,971 A | 10/1994 | Austin et al. | |
| 5,413,364 A | 5/1995 | Hafendorfer | |
| 5,423,565 A | 6/1995 | Smith | |
| 5,564,721 A | 10/1996 | Wians | |
| 5,575,140 A | 11/1996 | Bermes et al. | |
| 5,653,466 A | 8/1997 | Berrios | |
| 5,685,554 A * | 11/1997 | Poxleitner | 280/491.2 |
| 5,810,371 A | 9/1998 | Velke | |

(Continued)

OTHER PUBLICATIONS

U.S. Appl. No. 10/933,685, filed Sep. 3, 2004, Davis et al.

(Continued)

*Primary Examiner*—Christopher P Ellis
*Assistant Examiner*—Katy Meyer
(74) *Attorney, Agent, or Firm*—Mueting, Raasch & Gebhardt, P.A.

(57) ABSTRACT

A sulky for attachment to a self-propelled machine, e.g., lawn mower. Sulkies in accordance with embodiments of the present invention may attach to, and detach from, the lawn mower with operator-actuatable, spring-loaded pins. The sulky may further pivot, relative to the mower, from an operating position to a storage position. A spring-loaded latch may be used to operatively secure the sulky relative to the mower frame when the sulky is in the storage position.

9 Claims, 5 Drawing Sheets

U.S. PATENT DOCUMENTS

| | | | |
|---|---|---|---|
| 5,813,679 | A | 9/1998 | Hobrath |
| 5,882,020 | A | 3/1999 | Velke |
| 5,909,887 | A | 6/1999 | Hobrath |
| 5,947,505 | A | 9/1999 | Martin |
| D417,676 | S | 12/1999 | Havener |
| 6,000,705 | A | 12/1999 | Velke |
| 6,003,625 | A | 12/1999 | Neuling |
| 6,062,582 | A | 5/2000 | Martin |
| 6,145,855 | A | 11/2000 | Bellis, Jr. |
| 6,234,495 | B1 | 5/2001 | Velke |
| 6,375,201 | B2 | 4/2002 | Havener |
| 6,485,036 | B1 | 11/2002 | Bricko |
| 6,488,291 | B1 | 12/2002 | Bellis, Jr. |
| 6,497,422 | B1 | 12/2002 | Bellis, Jr. |
| 6,557,331 | B2 | 5/2003 | Busboom et al. |
| 6,619,686 | B1 * | 9/2003 | Klar ............ 280/491.3 |
| 7,004,272 | B1 | 2/2006 | Brown et al. |
| 7,300,061 | B1 | 11/2007 | Omstead |
| 2004/0093840 | A1 | 5/2004 | Velke et al. |
| 2006/0103093 | A1 | 5/2006 | Kallevig |

OTHER PUBLICATIONS

"Mower Sulky® Illustrated Parts List MS2000 One-Wheel Sulky," Havener Enterprises, Inc. Jun. 28, 2004;1 pg.

"Mower Sulky® Illustrated Parts List MS20002 One-Wheel Sulky," Havener Enterprises, Inc. Jun. 3, 2005;1 pg.

"Mower Sulky® Illustrated Parts List TS2000 Two-Wheel Sulky," Havener Enterprises, Inc. Jul. 14, 2004;1 pg.

"Mower Sulky® Illustrated Parts List TS2002 Two-Wheel Sulky," Havener Enterprises, Inc. Jun. 3, 2005;1 pg.

"Mower Sulky® Illustrated Parts List SW2000 Swivel Caster Wheel," Havener Enterprises, Inc. Jun. 28, 2004;1 pg.

"Mower Sulky® Illustrated Parts List SW2002 Swivel Caster Wheel," Havener Enterprises, Inc. Jun. 3, 2005;1 pg.

"Mower Sulky® SDS2004 Illustrated Parts List," Havener Enterprises, Inc., [retrieved on Oct. 21, 2005]. Retrieved from the Internet:<URL http://www.mowersulky.com/SDS2004%20IPL.pdf>;4 pgs.

"Mower Sulky® Parts Breakdown" Havener Enterprises, Inc., [retrieved on Sep. 28, 2005]. Retrieved from the Internet:<URL http://www.mowersulky.com/MS1323.pdf>;1 pg.

"Mower Sulky" Roberts Supply, Inc. advertisement, "Power Equipment Trade," Jul./ Aug. 1998, p. 41; 1 pg.

"Steerable Sulky Operator's & Parts Manual," Exmark® Mfg. Co.Inc., Part No. 1-850595 Rev. B., 2000; 12 pgs.

"Tru Trak® Sulky Fixed Deck Mid Size Mower Attachment, Operator's Manual," Toro®, Model No. 30109-Serial No. 240000001 and Up, Form No. 3351-357 Rev A, 2004; 8 pgs.

* cited by examiner

SULKY FOR USE WITH WALK-BEHIND MACHINE

TECHNICAL FIELD

The present invention relates generally to walk-behind power equipment and, more particularly, to a sulky for use with a self-propelled, walk-behind power lawn mower or the like.

BACKGROUND

Walk-behind power machines such as wide-area lawn mowers have been in use for years. These mowers generally include a frame having an engine that powers driven wheels as well as a cutting deck. Rearwardly extending handlebars are typically provided to permit operator control of the mower. By selectively manipulating controls on the handlebars, the operator can control the direction and speed of the mower. These walk-behind mowers provide potential advantages over conventional riding mowers including, for example, simpler operation, lower operating cost, higher maneuverability, and smaller size.

While effective, operation of walk-behind mowers may, in certain circumstances, result in premature operator fatigue due to the need to continually walk behind the mower at what is often considered a brisk pace. In the commercial landscape and lawn care business, it is not uncommon to operate these mowers in excess of eight hours per day.

To alleviate operator fatigue, sulkies may be used. Sulkies are typically configured as a trailered apparatus which connects to a frame of the lawn mower. The operator may then ride on a platform of the sulky, thereby eliminating the need to constantly walk during operation.

While conventional sulkies may advantageously reduce operator fatigue, many designs have drawbacks. For example, it is sometimes desirable that a lawn mower be able to easily revert to a walk-behind configuration for certain mowing conditions. However, many sulkies are not designed for easy removal, resulting in time-consuming actions to detach/re-attach the sulky. Other configurations provide walk-behind capability by repositioning the sulky to an inoperative position without removing the sulky from the mower. Such sulkies, however, typically require secondary mechanisms, e.g., chains or the like, that must be separately attached to the mower in order to secure the sulky in the desired position.

Still further, many prior art sulkies require periodic maintenance to ensure operating effectiveness. For example, conventional pneumatic sulky tires are subject to leaks and flats, resulting in undesirable mower down-time. Further, for example, operation of sulkies in wet areas may result in excessive mud and debris collection on the tread of the tire. This debris may eventually interfere with tire rotation (e.g., locking of the tire), which may result in turf damage.

SUMMARY

The present invention provides sulkies, and methods of attaching sulkies, that overcome these and other problems.

In one embodiment, a sulky assembly for use with a self-propelled machine is provided. The sulky assembly includes a bracket rigidly attachable to a frame of the machine, wherein the bracket includes coupling members and a storage latch. A pull arm is also provided and includes a first end removably and pivotally attachable to the coupling members of the bracket; and a latch engagement member. The assembly also includes a sulky frame pivotally coupled to a second end of the pull arm, and a wheel assembly rotatably mounted to the sulky frame.

In another embodiment, a sulky attachable to a self-propelled machine is provided. The sulky includes a pull arm having a first end with captured first and second spring-loaded pins to engage a first lug and a transversely spaced-apart second lug, respectively, associated with the machine, wherein the first and second lugs define a first pivot axis about which the pull arm pivots. The sulky also includes a sulky frame pivotally coupled to a second end of the pull arm for pivoting about a second pivot axis, and a wheel assembly rotatably mounted to the sulky frame. The sulky is movable from an operating position, wherein the pull arm extends generally parallel to a ground surface, to a storage position, wherein the pull arm forms an acute angle with the ground surface and further wherein a latch engagement member on the pull arm securely engages a storage latch associated with the machine.

In still yet another embodiment, a method of coupling a sulky to a self-propelled machine is provided. The method includes providing a sulky with a pull arm having spaced-apart first and second spring-loaded pins at a first end, and a sulky frame supporting a wheel assembly at a second end. The method further includes retracting the first and second spring-loaded pins; positioning the first end of the pull arm proximate the machine; and releasing the first and second spring-loaded pins such that each pin engages respective lugs associated with the machine.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein.

Figure 1:
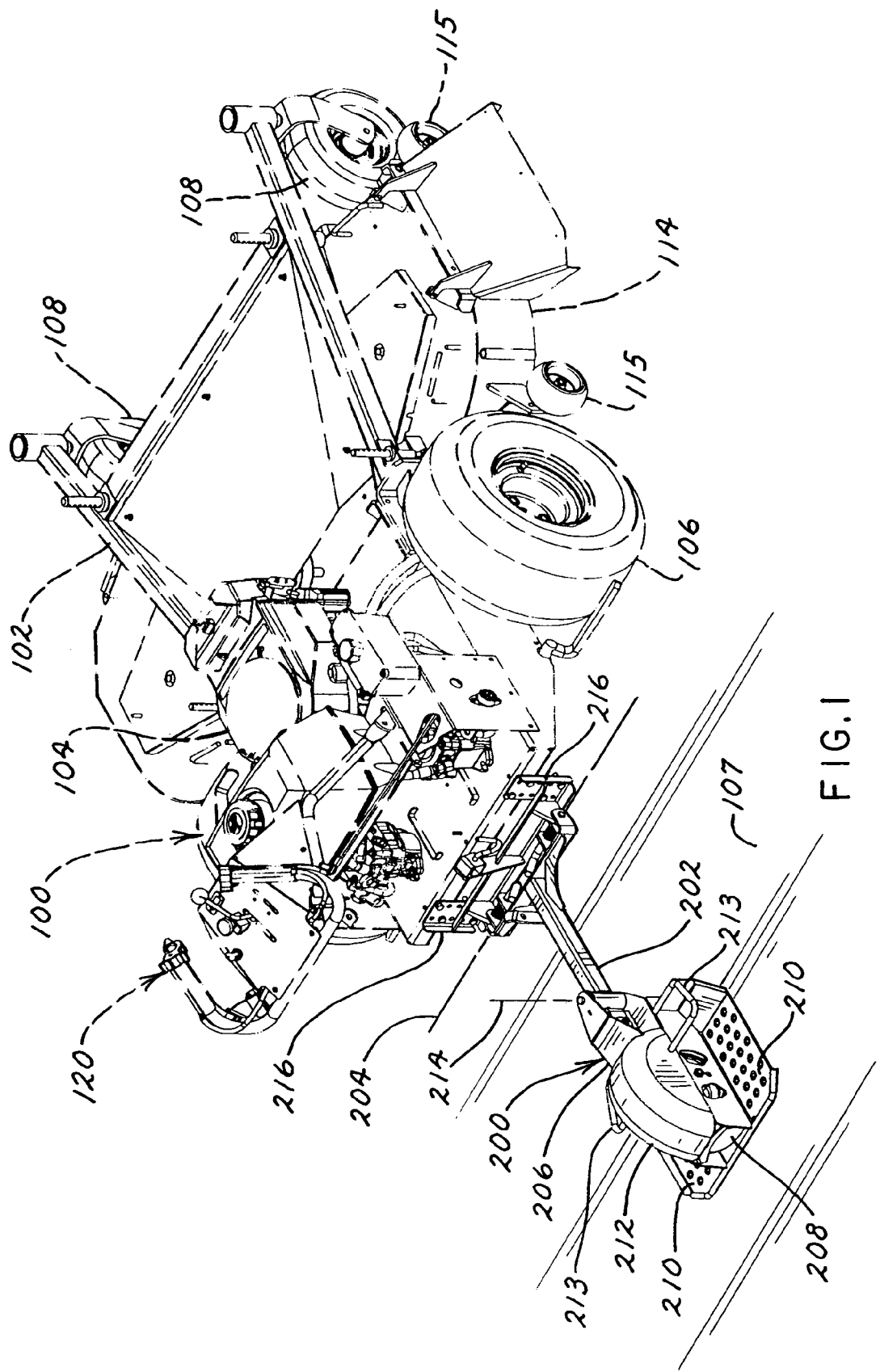
FIG. 1 is a perspective view of a self-propelled machine, e.g., power lawn mower, having a sulky in accordance with one embodiment of the invention attached thereto, the sulky shown in a first operating position.

Unless stated otherwise herein, the figures of the drawing are rendered primarily for clarity and thus may not be drawn to scale.

DETAILED DESCRIPTION OF EXEMPLARY EMBODIMENTS

In the following detailed description of illustrative embodiments of the invention, reference is made to the accompanying figures of the drawing that form a part hereof, and in which are shown, by way of illustration, specific embodiments in which the invention may be practiced. It is to be understood that other embodiments may be utilized and structural changes may be made without departing from the scope of the invention.

Generally speaking, the present invention is directed to a self-propelled machine and a ride-on sulky attachment for use with the same. The sulky permits an operator of the machine to ride on the sulky rather than walk behind the machine during use. Sulkies in accordance with embodiments of the present invention may also be reconfigured between a first operating position and a second storage position. When configured in the latter position, the operator may walk behind the machine without interference from the attached sulky.

FIG. 1 shows a sulky 200 in accordance with one embodiment of the present invention as it may be incorporated on a self-propelled machine, e.g., a power lawn mower 100. While, for the sake of brevity, the invention is herein described with respect to a particular mid-size, walk-behind power lawn mower (hereinafter generically referred to as "mower"), those of skill in the art will realize that the invention is equally applicable to other walk-behind mowers, as well as to most any other walk-behind, self-propelled ground-working vehicle, e.g., skid-steer loader, aerator, snow thrower, tiller, etc.

FIG. 1 illustrates the exemplary mower 100 (shown primarily in broken lines) having a frame 102 supporting a prime mover, e.g., internal combustion engine 104. A pair of transversely opposing, ground engaging drive wheels 106 (only right wheel visible) may support the rear of the mower 100 in rolling engagement with a ground surface 107. Each drive wheel 106 may be powered by a hydraulic motor which receives power from a hydraulic pump under the control of various operator-controlled valves. The hydraulic pumps, in turn, may be powered by the engine 104. Other drive systems, e.g., mechanical belt and pulley systems, are also possible without departing from the scope of the invention. A pair of front swiveling caster wheels 108, which may be connected to forwardly extending portions of the frame 102, may support the front of the mower 100 in rolling engagement with the ground surface 107.

As used herein, relative terms such as "left," "right," "fore," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon the generally horizontal ground surface 107 as shown in FIG. 1. These terms are used herein only to simplify the description, however, and not to limit the scope of the invention in any way.

It is further noted that the terms "comprises" and variations thereof do not have a limiting meaning where these terms appear in the description and claims. Moreover, as used herein, "a," "an," "the," "at least one," and "one or more" are used interchangeably.

A cutting deck 114 may be mounted to a lower side of the frame 102 generally between the drive wheels 106 and the caster wheels 108. The cutting deck 114 may include one or more cutting blades (not shown) as known in the art. During operation, power is selectively delivered to the blades of the cutting deck 114 by the engine 104, whereby the blades rotate at a speed sufficient to sever grass and other vegetation passing underneath the deck. The cutting deck 114 may include other features, e.g., deck rollers 115, to assist in supporting the deck relative to the ground surface 107 during mower operation.

An operator control system 120 may be located near the rear of the mower. The control system 120 may include various levers and handles to assist the operator in controlling the direction and speed of each drive wheel 106, thereby allowing the operator to control mower speed and direction from a walking or riding position generally behind the mower 100. In one embodiment, the control system 120 may be similar or identical to that described in U.S. Pat. No. 6,557,331 to Busboom et al.

With this brief introduction, sulkies in accordance with embodiments of the present invention will now be described. In the illustrated embodiment, the sulky 200 may include a drawbar or pull arm 202 having a first or forward end pivotally attached to the rear of the mower 100 for pivoting about a first, e.g., horizontal, pivot axis 204.

The sulky 200 may also include a sulky frame 206 to which a rotatable wheel assembly 208 is mounted. The frame 206 may include at least one platform 210 to support the operator (e.g., a standing or, alternatively, sitting operator) during mower operation. In the illustrated embodiment, the frame includes two platform sections 210 positioned on opposing sides of the wheel assembly 208 (see FIG. 1). A fender 212 may extend over a portion of the wheel assembly 208 to restrict unintended contact between the operator and the rotating wheel assembly. Other features, e.g., guards 213, may also be provided to assist with maintaining the operator's feet in the desired location. The frame 206 itself may pivotally couple to a second or rearward end of the pull arm 202 such that the frame pivots (relative to the pull arm) about a second, e.g., vertical, pivot axis 214.

Figure 2:
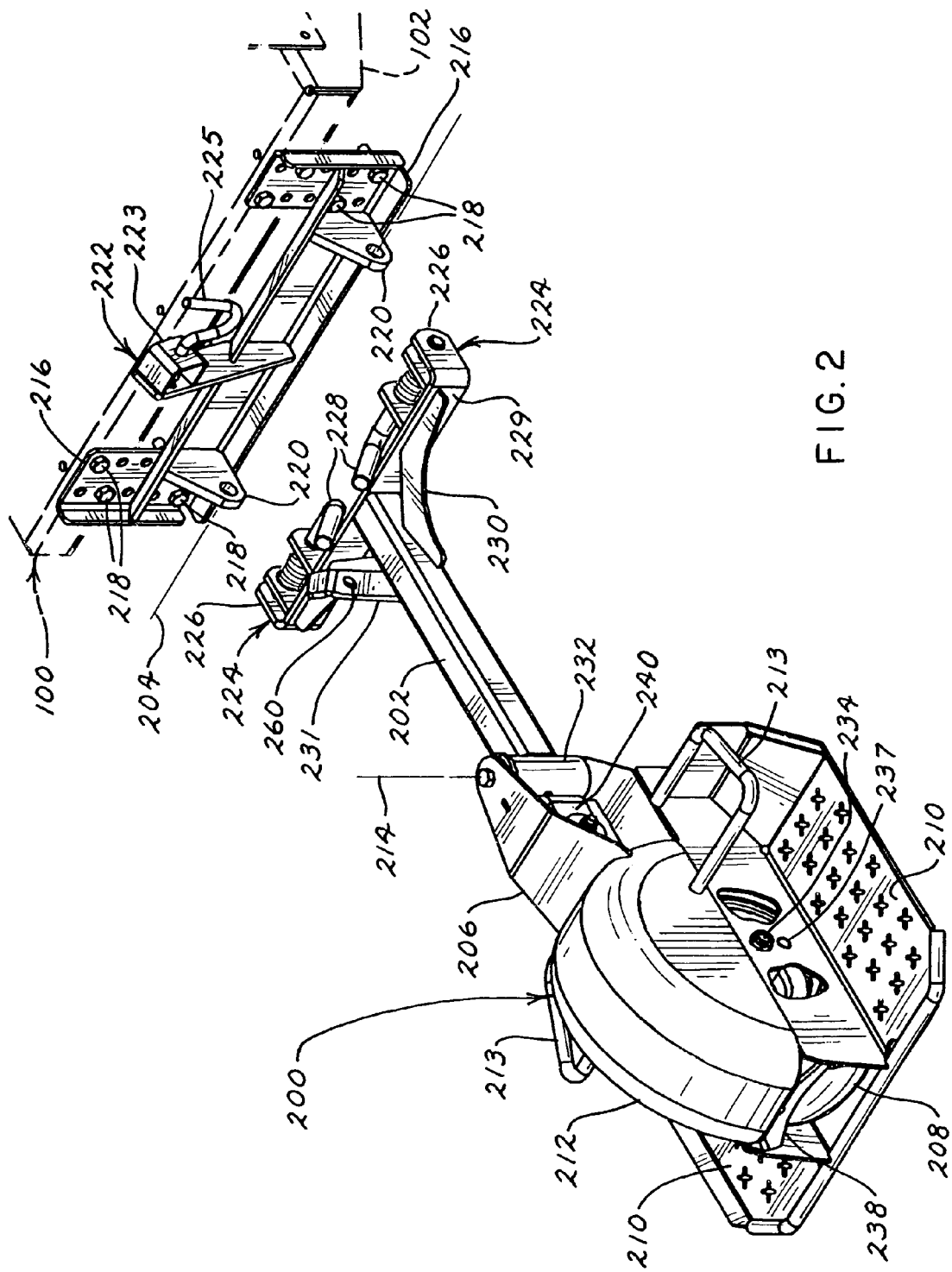
FIG. 2 is a perspective view of the sulky of FIG. 1 disconnected from the mower.

FIG. 2 illustrates an enlarged view of the sulky 200 detached from the mower 100. As shown in this view, the sulky 200 may form part of a sulky assembly that also includes a bracket, e.g., a hitch frame 216, to permit attachment of the sulky to the frame 102 of the mower. The hitch frame 216 may include one or more separate components that rigidly attach (e.g., with fasteners 218) to a rear portion of the mower frame 102. However, other configurations may attach the hitch frame 216 to the mower in most any manner. Alternatively, the hitch frame 216 could be formed integrally with the mower frame, e.g., the frame 102 could incorporate features that permit direct attachment of the sulky thereto.

The hitch frame 216 may include coupling members, e.g., first and second spaced-apart lugs 220, that define the horizontal pivot axis 204. The hitch frame 216 may also include a storage latch 222 for securing the sulky 200 in the second storage position as further described below. In the illustrated embodiment, the storage latch 222 is defined by a box frame 223 capturing a biased, e.g., spring-loaded, pin 225 as further described below.

The forward end of the pull arm 202 may include connectors that attach to the coupling members of the mower 100, e.g., to the hitch frame 216. In one embodiment, the connectors are configured as a pair of transversely spaced-apart clevis assemblies 224 operable to engage the lugs 220 of the hitch frame. Each clevis assembly 224 may include a U-shaped clevis 226 and a captured and biased, e.g., spring-loaded, pin 228. As further described below, the spring-loaded pins 228 may be retracted to permit coupling of each clevis 226 to its associated lug 220, after which the pin may be engaged through the clevis and the lug to secure the sulky 200 in the first operating position.

To provide desirable structural integrity, the lugs 220 and clevises 226 may be transversely spaced-apart. Such a transverse offset provides a sulky system that is better able to withstand various operating forces, e.g., moments about a longitudinal axis of the pull arm 202. While the exact spacing between lugs 220 may be dictated by many variables, e.g., lug/clevis size and material, mower design requirements, etc., the lugs may, in one embodiment, be spaced several inches, e.g., 5-10 inches, apart.

To accommodate the spaced-apart configuration of the clevis assemblies 224, the front end of the pull arm 202 may include a transverse beam 229 rigidly attached thereto. One or more gussets 230 may be provided to reinforce the transition between the longitudinal pull arm 202 and the transverse beam 229.

While described herein as incorporating lugs 220 on the hitch frame 216 and clevises 226 on the sulky, this configuration could be reversed. Moreover, other mechanical connections that permit pivotal coupling of the sulky are also possible without departing from the scope of the invention.

The pull arm 202 may further include a latch engagement member 231. The latch engagement member 231 may be a rigid, protruding tab positioned to engage the storage latch 222 when the sulky is placed in the second storage position as further described below and illustrated in FIG. 4. The latch engagement member 231 may, in one embodiment, be located proximate the first end of the arm 202 to correspond to the location of the storage latch 222. However, other embodiments may locate the latch engagement member 231 elsewhere without departing from the scope of the invention.

The second end of the pull arm 202 may form, or otherwise include, a pivot assembly 232. The pivot assembly attaches the sulky frame 206 to the second end of the pull arm 202 and permits relative pivotal motion about the vertical pivot axis 214. While not wishing to be bound to any particular embodiment, the pivot assembly 232 may be configured as generally described in U.S. patent application Ser. No. 10/933,685 (filed 3 Sep. 2004) to Davis et al.

The frame 206 may form a clevis that engages the pivot assembly 232 as generally illustrated in FIGS. 1, 2, 4, and 5. In the illustrated embodiment, the frame 206 forms a single weldment that includes, among other components, the platforms 210, fender 212, and guards 213.

The wheel assembly 208 may be rotatably mounted to the sulky frame 206 via a fastener 234 as shown in FIG. 2. For example, the fastener 234 may pass through a hub (not shown) of the wheel assembly 208 and through opposing aligned first openings (the first opening on the right side of the frame is not visible due to the presence of the fastener 234 in FIG. 2) formed in the frame 206. To alter the elevation of the wheel assembly 208 relative to the frame 206, second openings 237 may also be provided. Moving the wheel assembly 208 such that the fastener 234 passes through the second openings 237 (as compared to the first openings) would position the frame 206 at a higher elevation.

The frame 206, e.g., the fender 212, may optionally include a scraping member or wiper 238 positioned in close proximity to a ground-engaging surface of the wheel assembly 208 (e.g., a surface of the tire). During operation, the wiper 238 may wipe mud and other ground debris that adheres to the tire.

The frame 206 may further include one or more stop members 240 positioned proximate the pivot assembly 232. The stop member may limit the relative pivotal motion of the frame 206 about the vertical pivot axis 214. In one embodiment, the stop member 240 includes a rubber strap fastened about a plate 252 of the frame 206 (see FIG. 5).

Figure 3:
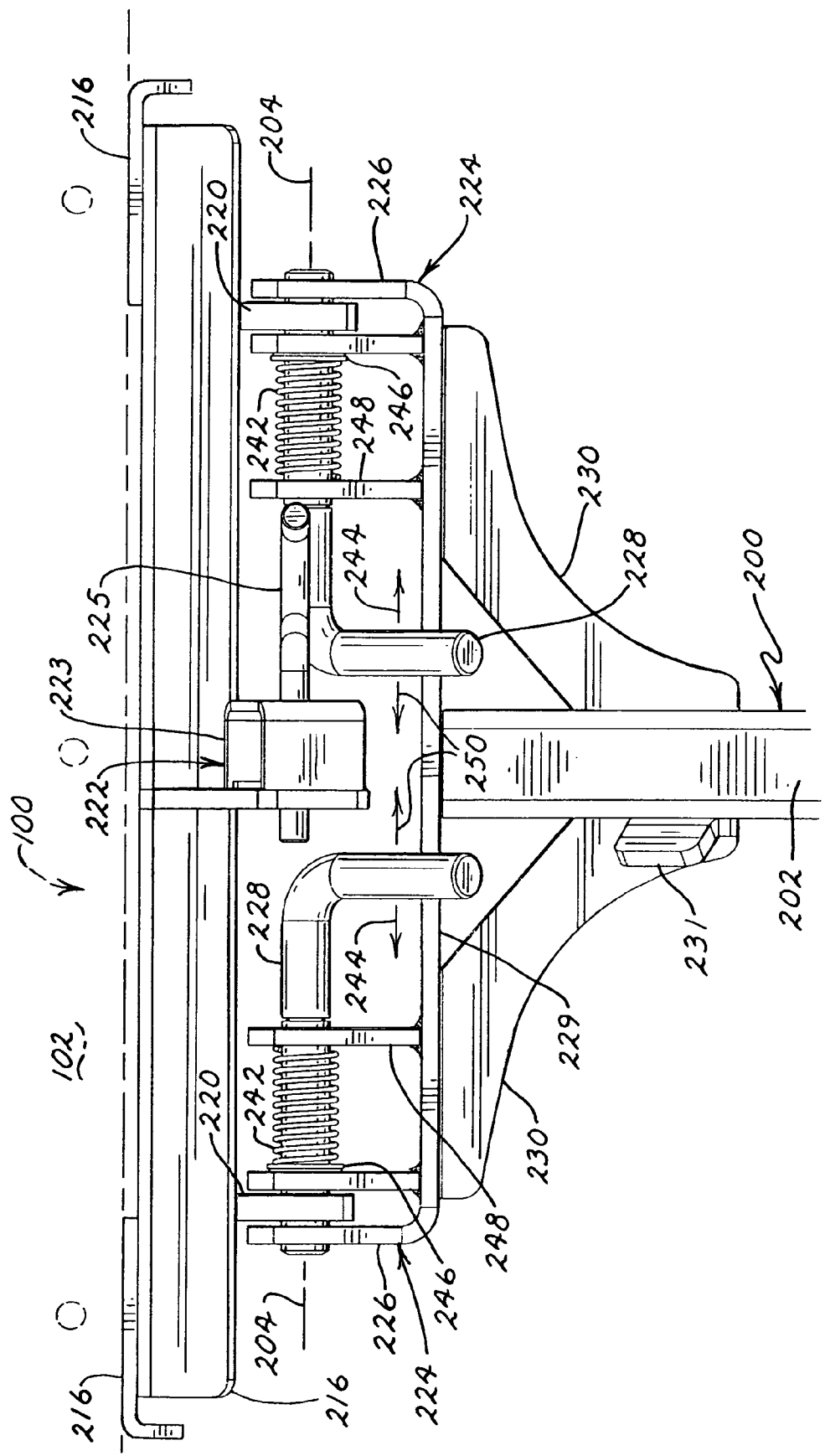
FIG. 3 is a partial top plan view of the sulky and mower of FIG. 1, wherein the sulky is shown in the first operating position.

FIG. 3 is an enlarged top plan view of a portion of the mower 100 and sulky 200 when the latter is coupled to the former. As shown in this view, each clevis 226 may surround its respective lug 220 such that each spring-loaded pin 228 may slide through both its respective clevis and lug to secure the sulky 200 in place. Each pin preferably includes a spring 242 to provide the biasing force in a first laterally outward direction 244. The spring 242 may be reacted by a washer member 246 (e.g., a snap ring or E-clip) attached to the pin 228 that abuts an inner face of the clevis 226, and by a guide lug 248 attached to the transverse beam 229. To couple or decouple the sulky to or from the mower 100, the operator may grasp the L-shaped pins 228 and displace them in an inward direction 250. This motion will cause the distal ends of the pins 228 to move inwardly, thereby allowing attachment/separation of the sulky 200 from the mower 100.

Figure 4:
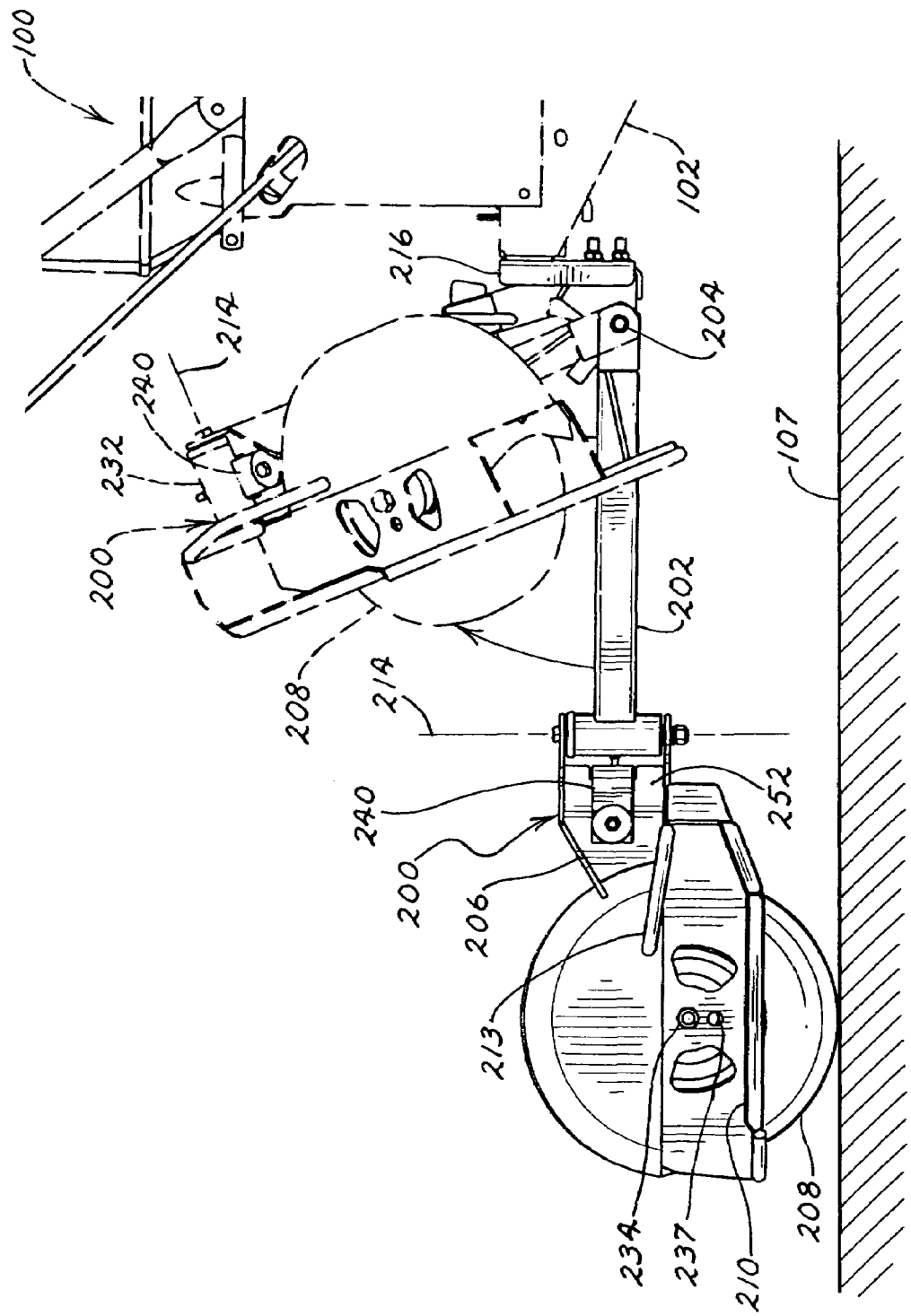
FIG. 4 is a side elevation view of a portion of the mower of FIG. 1 with the sulky shown in the first operating position (solid lines) and a second storage position (broken lines)

FIG. 4 is a side elevation view of the sulky 200 in both the first operating position (solid lines) and the second storage position (broken lines). In the first operation position, the pull arm 202 may extend generally parallel to the horizontal ground surface 107 such that the wheel assembly 208 is in rolling engagement with the ground surface. The wheel assembly 208 may be adjusted (moved between the first openings and the second openings 237) relative to the frame 206, and/or the hitch frame 216 may be adjusted relative to the mower frame 102 (e.g., see multiple mounting patterns in FIG. 2) to achieve the desired positioning.

To mechanically limit pivotal movement of the sulky about the pivot axis 214, the plate 252/stop member 240 may be configured to contact the arm at extreme angular displacements. In the illustrated embodiment, the frame 206 may pivot about 290 degrees before the pull arm 202 contacts the rubber stop members 240.

In use, the hitch frame 216 may first be attached to the mower frame 102. With the sulky 200 located proximate the hitch frame 216 as shown in FIG. 2, the operator may then manually retract the pins 228 (e.g., move the pins in the direction 250 as illustrated in FIG. 3). The clevis assemblies 224 may then be brought into alignment with the lugs 220 such that the pins may engage the lugs. Upon release of the pins 228, the springs 242 then bias the pins in the direction 244 (see FIG. 3), capturing the lugs 220 within their respective clevises 226. As a result, the sulky is pivotally attached to the hitch frame 216 and ready for operation (removal of the sulky 200 from the mower 100 may be accomplished by reversing the process, e.g., retracting the pins 228 until they withdraw from the lugs 220).

The operator may then stand on the platforms 210 (see FIG. 1) and, via manipulation of the operator control system 120, control the speed, direction and functions of the mower 100. As undulations in the ground are traversed, the sulky may pivot about the horizontal pivot axis 204. Moreover, as the mower is turned, the sulky, e.g., frame 206, may pivot about the vertical pivot axis 214. Once again, the stop member 240 may limit the pivotal motion of the frame 206 during use.

To reduce maintenance requirements of the sulky 200, some embodiments may utilize a wheel assembly 208 incorporating a semi-pneumatic tire. The semi-pneumatic tire configuration may reduce downtime as compared to pneumatic tires by reducing or eliminating the occurrence of flats. Moreover, the tire may utilize a generally treadless design. As a result, the tire surface may be less prone to accumulating dirt and debris as is sometimes experienced with conventional treaded sulky tires. In the event some debris does adhere to the tire, the optional wiper 238 (see FIG. 2) may serve to wipe the rotating tire and reduce or prevent accumulated debris buildup that could otherwise interfere with wheel rotation.

In some circumstances, the operator may desire to walk behind the mower 100 rather than ride upon the sulky, e.g., when significant reverse movement of the mower is anticipated. In these instances, the operator may easily move the sulky to the second storage position illustrated in broken lines in FIG. 4 rather than remove the sulky altogether from the mower 100. In the second storage position, the sulky 200 is secured to the mower in a non-interfering, elevated position, thereby permitting the operator to walk behind the mower without sulky interference. In the second storage position, the pull arm 202 may form an acute angle with the ground surface 107 as shown in FIG. 4.

Figure 5:
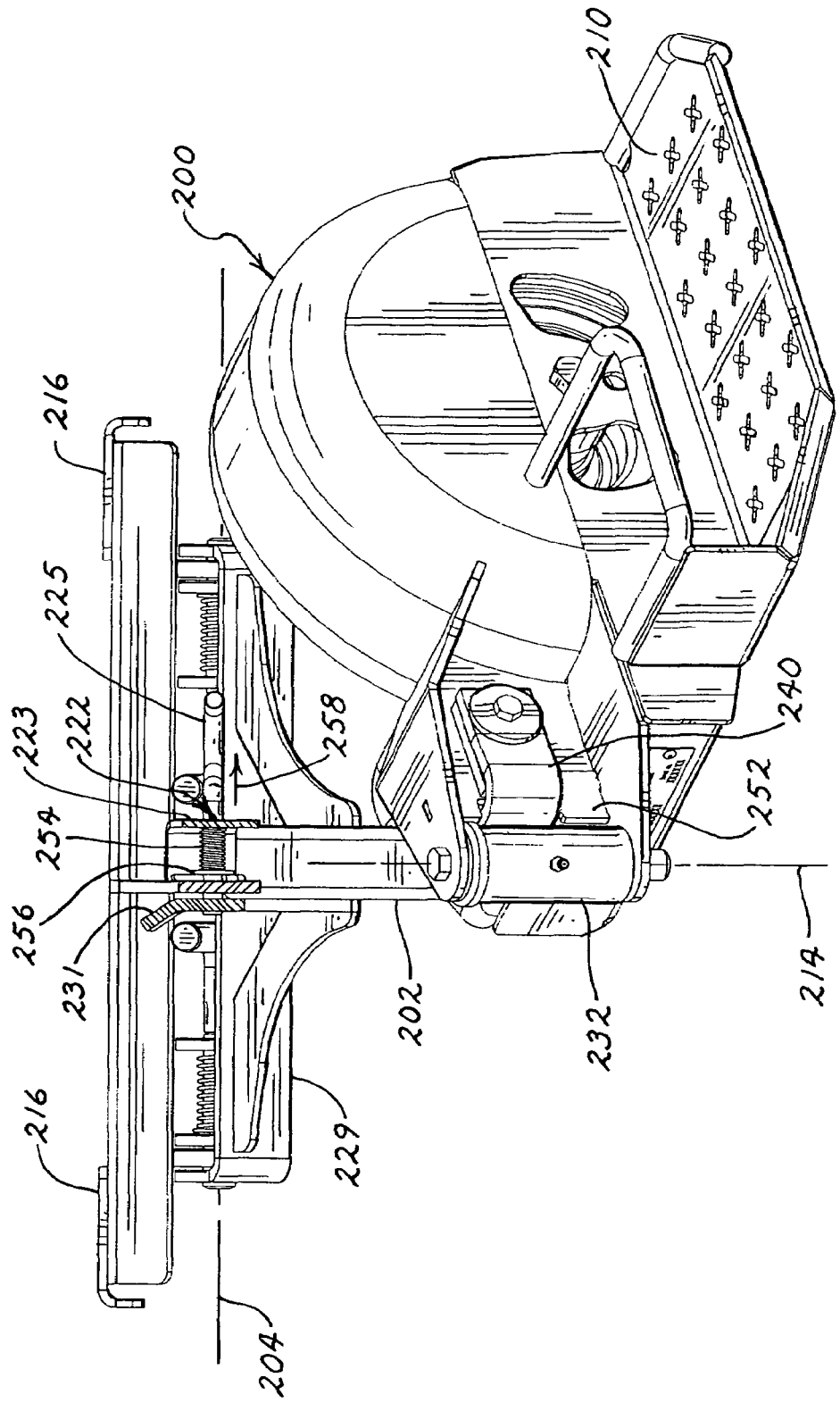
FIG. 5 is a partial top plan view of the sulky and mower of FIG. 1, wherein the sulky is shown in the second storage position, and further wherein a portion of the sulky shown in section.

To move the sulky 200 to the second storage position, the operator may grasp the sulky, e.g., by the guard 213, and pivot it about the horizontal pivot axis 204 to the second storage position as shown in FIGS. 4 and 5. Upon approaching the second storage position, the latch engagement member 231 may displace the pin 225 of the storage latch 222 automatically (without direct operator interaction). Like the clevis assemblies 224, the storage latch 222 may include a biasing member, e.g., a spring 254, to bias the pin 225. The spring 254 may act against a surface of the box frame 223 and a washer member (e.g., an E-clip, or a washer 256 held relative to the pin 225 by a cotter pin or the like (not shown)).

As the latch engagement member 231 moves towards the second storage position, the flared end of the member may displace the pin 225 in the direction 258 of FIG. 5. When the sulky 200 reaches the second storage position, an opening 260 (see FIG. 2) in the latch engagement member 231 aligns with the spring-loaded pin 225. The biasing force of the spring 254 then drives the pin 225 into the opening 260, thus securing the sulky 200 in the second storage position such that the wheel assembly 208 is suspended above the ground surface.

The frame 206 of the sulky 200 may then be pivoted about the pivot axis 214 until the stop member 240 rests against the pull arm 202 as shown in FIGS. 4 and 5. The operator may then control the mower while walking behind it without interference from the sulky.

The sulky may be returned to the first operating position by lifting up on the sulky and retracting the pin 225 from the latch engagement member 231, freeing the sulky to pivot back to its operating position.

Sulkies in accordance with embodiments of the present invention may provide numerous advantages. For example, sulkies as described herein may be rigidly secured, when in the storage position, relative to the mower frame rather than loosely supported by a chain or the like. Moreover, attaching the sulky to the mower, and securing the sulky in the storage position, may be accomplished using easily-actuated, spring-loaded pins displaceable with a single hand. Preferably, the spring-loaded pins are captured so that the sulky may be attached/detached from the mower, and moved to and from the storage position, without the use of tools and without the need for separate components that may be prone to loss and/or misplacement (e.g., loose fasteners or pins). Sulkies in accordance with embodiments of the present invention may further reduce downtime attributable to tire flats by utilizing a semi-pneumatic tire. Further benefits are realized from the inclusion of a fender-mounted tire scraper and the use of a smooth-treaded (e.g., treadless) tire that may both reduce the occurrence of wheel lock due to debris and mud buildup.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below, and equivalents thereof.

What is claimed is:

1. A sulky attachable to a self-propelled machine, the sulky comprising:
   a pull arm having a first end comprising captured first and second spring-loaded pins to engage a first lug and a transversely spaced-apart second lug, respectively, associated with the machine, wherein the first and second lugs define a first pivot axis about which the pull arm pivots;
   a sulky frame pivotally coupled to a second end of the pull arm for pivoting about a second pivot axis; and
   a wheel assembly rotatably mounted to the sulky frame, wherein the sulky frame comprises a fender extending over a portion of the wheel assembly, the fender comprising a wiper positioned in close proximity to a ground-engaging surface of the wheel assembly,
   and wherein the sulky is movable from an operating position, wherein the pull arm extends generally parallel to a ground surface, to a storage position, wherein the pull arm forms an acute angle with the ground surface and further wherein a latch engagement member on the pull arm securely engages a storage latch associated with the machine.

2. The sulky of claim 1, wherein the latch engagement member comprises a protruding tab defining an opening therein, and the storage latch comprises a spring-loaded latching pin to engage the opening.

3. The sulky of claim 1, wherein the first and second spring-loaded pins are biased in a laterally outward direction.

4. The sulky of claim 1, wherein the wheel assembly comprises a semi-pneumatic tire.

5. The sulky of claim 1, wherein the wheel assembly rotatably mounts to the sulky frame at either a first elevation or a second elevation.

6. The sulky of claim 1, wherein the sulky frame comprises one or more platform sections.

7. The sulky of claim 6, wherein the sulky frame comprises two platform sections positioned on opposing sides of the wheel assembly.

8. The sulky of claim 1, wherein the sulky further comprises a stop member to limit pivotal motion of the sulky frame about the second pivot axis.

9. The sulky of claim 1, further comprising a bracket attachable to the machine, wherein portions of the bracket define the first and second lugs and the storage latch.

* * * * *